(12) United States Patent
Shimomura et al.

(10) Patent No.: US 9,193,344 B2
(45) Date of Patent: Nov. 24, 2015

(54) STRUCTURE FOR SPRING BRAKE CHAMBER

(75) Inventors: Takeo Shimomura, Tokyo (JP); Akinori Nishimura, Tokyo (JP)

(73) Assignee: NABTESCO AUTOMOTIVE CORPORATION, Tokyo (JP)

( * ) Notice: Subject to any disclaimer, the term of this patent is extended or adjusted under 35 U.S.C. 154(b) by 0 days.

(21) Appl. No.: 13/516,630

(22) PCT Filed: Dec. 16, 2010

(86) PCT No.: PCT/JP2010/073261
§ 371 (c)(1),
(2), (4) Date: Jun. 15, 2012

(87) PCT Pub. No.: WO2011/074706
PCT Pub. Date: Jun. 23, 2011

(65) Prior Publication Data
US 2012/0255818 A1    Oct. 11, 2012

(30) Foreign Application Priority Data

Dec. 16, 2009 (JP) .................. 2009-284752
Dec. 16, 2009 (JP) .................. 2009-284808

(51) Int. Cl.
*B60T 17/08* (2006.01)

(52) U.S. Cl.
CPC .................... *B60T 17/083* (2013.01)

(58) Field of Classification Search
USPC ................ 188/170; 92/63, 93, 96
See application file for complete search history.

(56) References Cited

U.S. PATENT DOCUMENTS

| 3,187,642 | A | * | 6/1965 | Cruse | 92/128 |
| 3,244,079 | A | * | 4/1966 | Herrera | 92/63 |
| 3,424,062 | A | * | 1/1969 | Gummer et al. | 92/63 |
| 3,439,585 | A | * | 4/1969 | Herrera | 92/130 R |

(Continued)

FOREIGN PATENT DOCUMENTS

| CN | 86105467 A | 4/1987 |
| CN | 1553872 A | 12/2004 |

(Continued)

OTHER PUBLICATIONS

The extended European search report issued on Jul. 3, 2013, which corresponds to EP10837727.6 and is related to U.S. Appl. No. 13/516,630.

(Continued)

*Primary Examiner* — Robert A Siconolfi
*Assistant Examiner* — James Hsiao
(74) *Attorney, Agent, or Firm* — Studebaker & Brackett PC (57) ABSTRACT

A structure for a spring chamber is formed by connecting a chamber case and a return spring housing case and includes a piston member and a push rod. The piston member has a spring receiving section which holds a power spring inside the chamber case and a cylinder body section which is interlocked with the spring receiving section. A diaphragm is arranged inside a return spring housing case chamber in the return spring housing case, defines a pressure medium chamber, and is deformed by an advancing and retracting operation of the cylinder body section. The push rod member advance and retract with an operation of the diaphragm, and performs braking or releasing of a brake. The push rod member is formed with integral molding of a push plate and a axle body section with aluminum material.

2 Claims, 5 Drawing Sheets

(56) References Cited

U.S. PATENT DOCUMENTS

| | | | |
|---|---|---|---|
| 4,263,840 A | 4/1981 | Herrera | |
| 4,729,290 A | 3/1988 | Ewald et al. | |
| 4,960,036 A | 10/1990 | Gummer et al. | |
| 5,067,391 A | 11/1991 | Choinski et al. | |
| 5,311,809 A | 5/1994 | Choinski et al. | |
| 5,320,026 A * | 6/1994 | Pierce | 92/63 |
| 5,358,077 A | 10/1994 | DeConti | |
| 5,507,217 A | 4/1996 | Plantan | |
| 5,588,348 A * | 12/1996 | Plantan et al. | 92/63 |
| 5,623,863 A | 4/1997 | Plantan | |
| 5,632,192 A | 5/1997 | Plantan et al. | |
| 5,636,562 A | 6/1997 | Choinski et al. | |
| 5,890,983 A | 4/1999 | Kawahara et al. | |
| 6,360,649 B1 * | 3/2002 | Plantan | 92/99 |
| 7,121,191 B1 | 10/2006 | Fisher | |
| 7,506,573 B2 * | 3/2009 | Scheckelhoff et al. | 92/63 |
| 2004/0182659 A1 | 9/2004 | Siebke | |
| 2009/0134697 A1 | 5/2009 | Savagner et al. | |
| 2010/0037764 A1 | 2/2010 | Hemery | |

FOREIGN PATENT DOCUMENTS

| | | |
|---|---|---|
| CN | 1924296 A | 3/2007 |
| CN | 101173700 A | 5/2008 |
| CN | 101321653 A | 12/2008 |
| DE | 19830154 A1 | 1/1999 |
| DE | 10244916 A1 | 4/2004 |
| EP | 0808262 A1 | 11/1997 |
| EP | 1918170 A1 | 5/2008 |
| EP | 2125468 A1 | 12/2009 |
| FR | 2802594 A1 | 6/2001 |
| JP | 08-505685 A | 6/1996 |
| JP | 09-210097 A | 8/1997 |
| JP | 2778963 B2 | 7/1998 |
| JP | 10-513134 A | 12/1998 |
| JP | 11-511091 | 9/1999 |
| JP | 3725592 B2 | 12/2005 |
| JP | 2006-291801 A | 10/2006 |
| JP | 2009-195942 A | 9/2009 |
| JP | 2006-284996 A | 10/2009 |
| WO | 96/24516 A1 | 8/1996 |
| WO | 2009/075659 A2 | 6/2009 |

OTHER PUBLICATIONS

The first Office Action issued by the Chinese Patent Office on Mar. 21, 2014, which corresponds to Chinese Patent Application No. 201080057815.3 and is related to U.S. Appl. No. 13/516,630.

International Search Report; PCT/JP2010/073261; Apr. 12, 2011.

* cited by examiner

STRUCTURE FOR SPRING BRAKE CHAMBER

TECHNICAL FIELD

The present invention is related to a structure for a release bolt assembled to a spring brake chamber to apply specifically for a compressed air brake device or the like for vehicles. Further, the invention is related to a structure for a spring chamber to apply specifically, to a compressed air brake device for vehicles.

BACKGROUND ART

Figure 6:
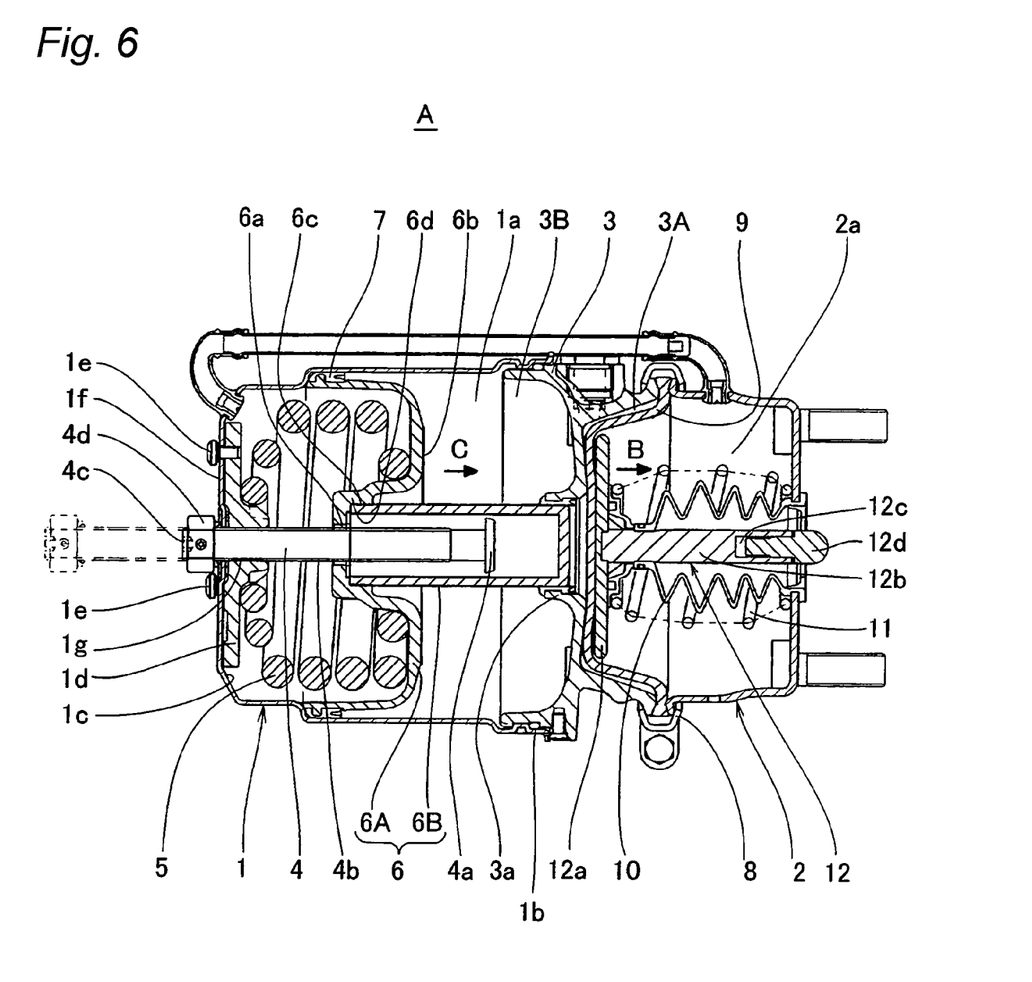
FIG. 6 is a vertical cross-sectional view showing an example of the spring brake chamber in the related art.

As a conventional art, such a spring brake chamber A is employed in a braking control system of heavy vehicles, for example, buses, trucks and trailers, and the spring brake chamber A in the conventional art is shown in FIG. 6. In describing the art, reference numeral 1 is a case on one side, reference numeral 2 is a case on the opposite side and both cases 1 and 2 are connected by a connecting case 3. The case 1 on one side has a chamber 1a and a release bolt 4 is arranged at an axial section thereof in the longitudinal direction. The inner section of the case 1 on one side retractably accommodates, in the axial direction, a spring receiving section 6A of a piston member 6 holding a power spring 5. The piston member 6 is configured of the spring receiving section 6A and a cylinder body section 6B. The outer edge of the spring receiving section 6A of the piston member 6 includes a piston cup 7, and accordingly, the spring receiving section 6A is slidably fitted at an inner wall of the case 1 on one side. When the spring receiving section 6A of the piston member 6, a surface 6b on one side being configured in a convex shape, advances to the right direction, the spring receiving section 6A of the piston member 6 engages a concave section of the connecting case 3.

One side of a cylinder body section 6B of the piston member 6 is retractably fitted at a rear surface of a axle centre of the spring receiving section 6A and the opposite side thereof is retractably fitted at a axle center section 3a of the connecting case 3. Reference numeral 8 is a clamp ring, which fixes the case 2 on the opposite side and the connecting case 3 with the presence of a diaphragm 9. Thus, the case 2 on the opposite side has a chamber 2a and a push rod member 12 is disposed in the chamber 2a. The diaphragm 9 moves to the right direction while compressing a boot 10 and a return spring 11 due to the approaching of the cylinder body section 6B of piston member 6 to the right direction.

The spring brake chamber A performs operations described below. Specifically, a brake pedal as a service brake is stepped on and thereby air pressure instructed from dual brake valves operates a relay valve and the compressed air enters from a service brake port (not shown) of the spring brake chamber A. Thus, air pressure is applied to a pressure chamber 3A (a chamber on the opposite side) of the connecting case 3 and the diaphragm 9 moves to the right direction. Accordingly, the boot 10 and the return spring 11 are compressed and a base plate 12a of the push rod member 12 is moved in the direction of the arrow B. A tip 12d connected to a axle section 12b protrudes moving in the right direction. Accordingly, the air pressure is transmitted to a wheel brake attached to the axle. Thus, the sleeve of an expander inside a brake shoe is expanded and the braking operation is performed by the work of the brake shoe.

On the other hand, when the parking brake is operated, the compressed air is released from the spring brake port (not shown) of the spring brake chamber A and the power spring 5 inside the case 1 on one side is extended, and the spring receiving section 6A and the cylinder body section 6B of the piston member 6 are moved in the direction of the arrow C. Thus, while the spring receiving section 6A is inserted in a chamber 3B on one side of the connecting case 3, the cylinder body section 6B pushes the diaphragm 9 and the base plate 12a of the push rod member 12 in the right direction. Accordingly, the boot 10 and the return spring 11 are compressed and thereby the base plate 12a of the push rod member 12 is moved in the direction of the arrow B. The tip 12d connected to the axle section 12b protrudes moving in the right direction. Accordingly, the air pressure is transmitted to the wheel brake attached to the axle. Thus, the sleeve of the expander inside the brake shoe is expanded and the braking operation is performed by the work of the brake shoe.

Here, the push rod member 12 is configured of a base plate 12a, a axle section 12b connected to the base plate 12a and a tip 12d screwed to a central axle hole 12c of the axle section 12b. The base plate 12a, the axle section 12b and the tip 12d are separated parts respectively and all made of a steel material.

Next, the order of assembling the spring brake chamber A is described in detail based on FIG. 6. A spring seat 1d is inserted in an inner bottom section 1c of the case 1 on one side, from an opening section of the right end 1b of the case 1 on one side and as shown in FIG. 6, a plurality of bolts 1e are screwed and inserted from a left end surface outer wall 1f of the case 1 on one side and thereby the spring seat 1d is fixed at the inner bottom section 1c of the case 1 on one side. At this time, the cylinder body section 6B, the connecting case 3 and the case 2 on the opposite side are not attached to the case 1 on one side. Thus, the power spring 5 is inserted from the opening section of the right end 1b of the case 1 on one side and thereby contacting with the spring seat 1d, and at the same time, the power spring 5 is accommodated inside the spring receiving section 6A. Thus, as shown in FIG. 6, a male screw section 4b formed on the outer edge of the release bolt 4 is inserted into a through hole 6a perforated at the center of the spring receiving section 6A. Here, a head section 4a of the release bolt 4 forms a circular collar. Thus, an assembly worker grips the head section 4a of the release bolt 4 with their fingers, a tool or the like and the end section 4c of the male screw section 4b of the release bolt 4 is screwed into a female screw section 1g perforated in the spring seat 1d to protrude outside the left end surface outer wall 1f of the case 1 on one side. A lock nut 4d is screwed to the end section 4c of the male screw section 4b and is engaged and fixed to the left end surface outer wall 1f of the case 1 on one side. Thus, the screw section 6c of the cylinder body section 6B in which the head section 4a of the release bolt 4 is inserted is screwed and fixed to the outer edge wall 6d of the through hole 6a of the spring receiving section 6A. Accordingly, the connecting case 3 and the case 2 on the opposite side are assembled sequentially and thereby the spring brake chamber A is completely provided.

CITATION LIST

Patent Literature

[PTL 1] JP-B-2778963.
[PTL 2] JP-A-11-511091.
[PTL 3] JP-B-3725592.

SUMMARY OF INVENTION

Technical Problem

In the related art, the structure of the release bolt 4 in the spring brake chamber A has the configuration described above and problems were present described below.

Specifically, it is required that release bolt 4 be screwed to the spring seat 1*d* by the assembly worker gripping and rotating the head section 4*a* of the release bolt 4 described above with their fingers, a tool or the like, and at this time, since the head section 4*a* of the release bolt 4 which is gripped with the fingers, the tool or the like is a circular collar, there are problems that the gripping is so troublesome that the workability for fixing the release bolt 4 to the spring seat 1*d* is worse to perform the work smoothly.

In addition, there is a problem that gripping the head section 4*a* of the release bolt 4 such a tool as a wrench is practically impossible and a special tool must be used.

Furthermore, in the conventional art, the structure of the spring chamber A has the configuration described above wherein the following problems were present.

That is, since the push rod member 12 described above is configured of three components and made of steel, there are problems in lightweight, durability, corrosion resistance and increase in production effort. Particularly, there is a possibility of the connecting portion between the base plate 12*a* and the axle section 12*b* of the push rod member 12 slackening through long term use thereof.

Solution to Problem

An object of the invention is to provide a release bolt having good assembling workability to improve the work capacity with respect to the structure of the release bolt in the spring brake chamber according, and the object is effected through the following configuration and means.

According to the invention, a structure for a spring brake chamber formed by connecting a chamber case and a return spring housing case, comprising:

a piston member having a spring receiving section which holds a power spring inside the chamber case and a cylinder body section which is interlocked with the spring receiving section;

a diaphragm, arranged inside the housing case of the return spring housing case, defining pressure medium chambers, and deformed by an advancing and retracting operation of the cylinder body section; and a push rod member which performs braking or releasing of advancing and retracting with the operation of the diaphragm, and the brake, wherein the release bolt screwed in the screw hole of the wall surface (the forward wall surface) on one side of the chamber case forms a collar where the cutting surface is formed at both side surfaces of the bolt head.

According to the invention, a structure for a spring brake chamber formed by connecting a chamber case and a return spring housing case, comprising:

a piston member having a spring receiving section which holds a power spring inside the chamber case and a cylinder body section which is interlocked with the spring receiving section;

a diaphragm, arranged inside the housing case of the return spring housing case, defining pressure medium chambers, and deformed by an advancing and retracting operation of the cylinder body section; and a push rod member which performs braking or releasing of advancing and retracting with the operation of the diaphragm, and the brake, wherein the release bolt screwed in the screw hole of the wall surface (the forward wall surface) on one side of the chamber case forms a circular collar and a hexagonal headed bolt projected from the circular collar.

In addition, an object of the invention is to provide a structure of the spring chamber D in which a highly durable push rod member is employed, the number of components is reduced, the base plate and axle is integrally molded using an aluminum (Al) material, and the length of the tip of the push rod member which is connected to the axle is adjusted for placement. The object of the invention is particularly to provide a push rod member which reduces production efforts to a large extent, in less deterioration and high durability, and the object is effected through the following configuration and means.

According to the invention in claim 1, A structure for a spring chamber formed by connecting a chamber case and a return spring housing case, comprising:

a piston member having a spring receiving section which holds a power spring inside the chamber case and a cylinder body section which is interlocked with the spring receiving section;

a diaphragm, arranged inside a return spring housing case chamber in the return spring housing case, defining a pressure medium chamber, and deformed by an advancing and retracting operation of the cylinder body section; and a push rod member, advancing and retracting with an operation of the diaphragm, and performing braking or releasing of a brake, wherein the push rod member is formed with integral molding of a push plate and a axle body section with aluminum material.

According to the invention in claim 2, A structure for a spring chamber formed by connecting a chamber case and a cylinder body base, comprising:

a piston member having a spring receiving section which holds a power spring inside the chamber case and a cylinder body section which is interlocked with the spring receiving section;

a diaphragm, arranged inside a cylinder body base chamber in the cylinder body base, defining a pressure medium chamber, and deformed by an advancing and retracting operation of the cylinder body section; and a push rod member, advancing and retracting with an operation of the diaphragm, and performing braking or releasing of a brake, wherein the push rod member is formed with integral molding of a push plate and a axle body section with aluminum material.

Advantageous Effects of Invention

The structure of the release bolt in the spring brake chamber according to the invention has the configuration described above and thereby advantages are present described below.

Specifically, according to the invention, the structure for a spring brake chamber formed by connecting a chamber case and a return spring housing case includes a piston member having a spring receiving section which holds a power spring inside the chamber case and a cylinder body section which is interlocked with the spring receiving section; a diaphragm arranged inside the return spring housing case chamber in the return spring housing case, defining pressure medium chambers and deformed by an advancing and retracting operation of the cylinder body section; and a push rod member advancing and retracting with the operation of the diaphragm, and performing braking or releasing of the brake, wherein the invention may employ the structure of the release bolt in the spring brake chamber characterized in that the release bolt screwed in the screw hole of the wall surface (the forward wall surface) on one side of the chamber case is a collar where the cutting surface is formed at both side surfaces of the bolt head section.

With the configuration described above, the assembly worker is able to easily grip and rotate the head section of the release bolt described above with a tool or the like and is able to screw the bolt into the spring seat. At this time, the gripping portion of the tool or the like fits the circular collar where the head section of the release bolt has the cutting surface for easy gripping. Thus, the work to fix the release bolt to the spring seat is performed accurately and smoothly. In addition, there are advantages that the head section of the release bolt can be gripped by a tool such as a general-purpose wrench other than a special tool, and the release bolt can be attached easily and quickly to the wall surface (the forward wall surface) on one side of the chamber case.

According to the invention, the structure for a spring brake chamber formed by connecting a chamber case and a return spring housing case includes a piston member having a spring receiving section which holds a power spring inside the chamber case and a cylinder body section which is interlocked with the spring receiving section; a diaphragm arranged inside the housing case of the return spring housing case, defining pressure medium chambers and deformed by an advancing and retracting operation of the cylinder body section; and a push rod member which performs braking or releasing of advancing and retracting with the operation of the diaphragm, and the brake, wherein the invention may employ the structure of the release bolt in the spring brake chamber characterized by the release bolt screwed in the screw hole of the wall surface (the forward wall surface) on one side of the chamber case forming the circular collar and a hexagonal headed bolt protruded from the circular collar.

With the configuration described above, adding to the first advantage of the invention, since the bolt head section has the circular collar as a stopper function and the hexagonal headed bolt is attached easily, quickly and accurately to the wall surface (the forward wall surface) on one side of the chamber case and thereby there is an advantage an increase in multifunction is achieved.

In addition, the structure of the spring chamber according to the invention has the configuration described above and thereby having advantages described below.

Specifically, according to the invention described in claim 1, the structure for a spring chamber formed by connecting a chamber case and a return spring housing case includes a piston member having a spring receiving section which holds a power spring inside the chamber case and a cylinder body section which is interlocked with the spring receiving section; a diaphragm arranged inside the return spring housing case chamber in the return spring housing case, defining pressure medium chambers and deformed by an advancing and retracting operation of the cylinder body section; and a push rod member advancing and retracting with the operation of the diaphragm, and performing braking or releasing of the brake, wherein the push rod member is formed with integral molding of a push plate and a axle body section with aluminum material.

With the configuration described above, in the spring chamber that connects the chamber case and the return spring housing case, the push plate or the axle body section is made of one integrally molded product with the aluminum material having strong corrosion resistance so that there is an advantage that the push rod member having light weight and high durability can be provided. In addition, the function thereof is good without problems even though long term use thereof, and in addition, since the central hole is disposed in the axle body section and the protruding rod made of, for example, steel can be inserted into the central hole, when the dimension and the shape of the length of the protruding rod are changed and set to apply to heavy vehicles, there are advantages that the push rod member formed of the push plate and the axle body section can be used as common components and can be employed in various vehicles.

According to the invention described in claim 2, the structure for a spring chamber formed by connecting a chamber case and a cylinder body base includes a piston member having a spring receiving section which holds a power spring inside the chamber case and a cylinder body section which is interlocked with the spring receiving section; a diaphragm arranged inside the cylinder body base chamber in the cylinder body base, defining pressure medium chambers and deformed by an advancing and retracting operation of the cylinder body section; and a push rod member advancing and retracting with the operation of the diaphragm, and performing braking or releasing of the brake, wherein the push rod member is formed with integral molding of a push plate and a axle body section with aluminum material.

With the configuration described above, in the spring chamber that connects the chamber case and the cylinder body base, the push plate or the axle body section is made of one integrally molded product from an aluminum material having strong corrosion resistance so that there is an advantage that the push rod member having light weight and high durability can be provided. In addition, the function thereof is good without problems even though there is long term use thereof, and in addition, since the central hole is disposed in the axle body section and the protruding rod made of, for example, steel can be inserted into the central hole, when the dimension and the shape of the length of the protruding rod are changed and set to apply to heavy vehicles, there are advantages that the push plate and the push rod member that is the axle body section can be used as common components and can be employed in various vehicles.

BRIEF DESCRIPTION OF DRAWINGS

FIGS. 3 (a) and (b) are views showing an embodiment of a structure for the release bolt according to the invention, (a) is an enlarged side view thereof and (b) is a front view seen from the direction of an arrow L-L of (a).

FIGS. 4 (a) and (b) are views showing an embodiment of a structure for the release bolt according to the invention, (a) is an enlarged side view thereof and (b) is a front view seen from the direction of a arrow M-M of (a).

DESCRIPTION OF EMBODIMENTS

Figure 3:
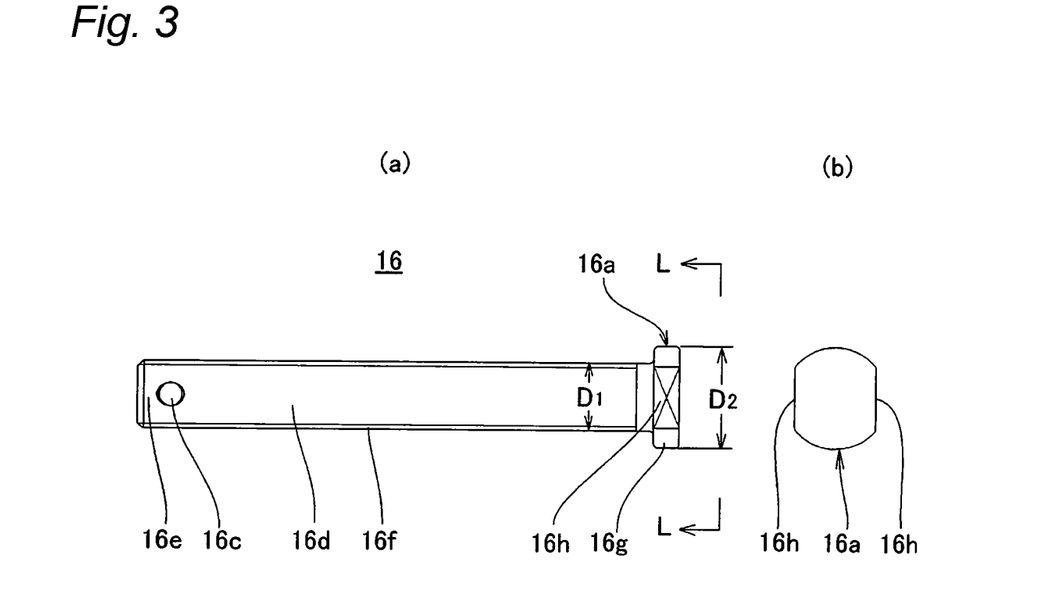

An embodiment of a structure for a release bolt of a spring brake chamber according to the invention is described based on FIGS. 3 (a) and (b).

Figure 1:
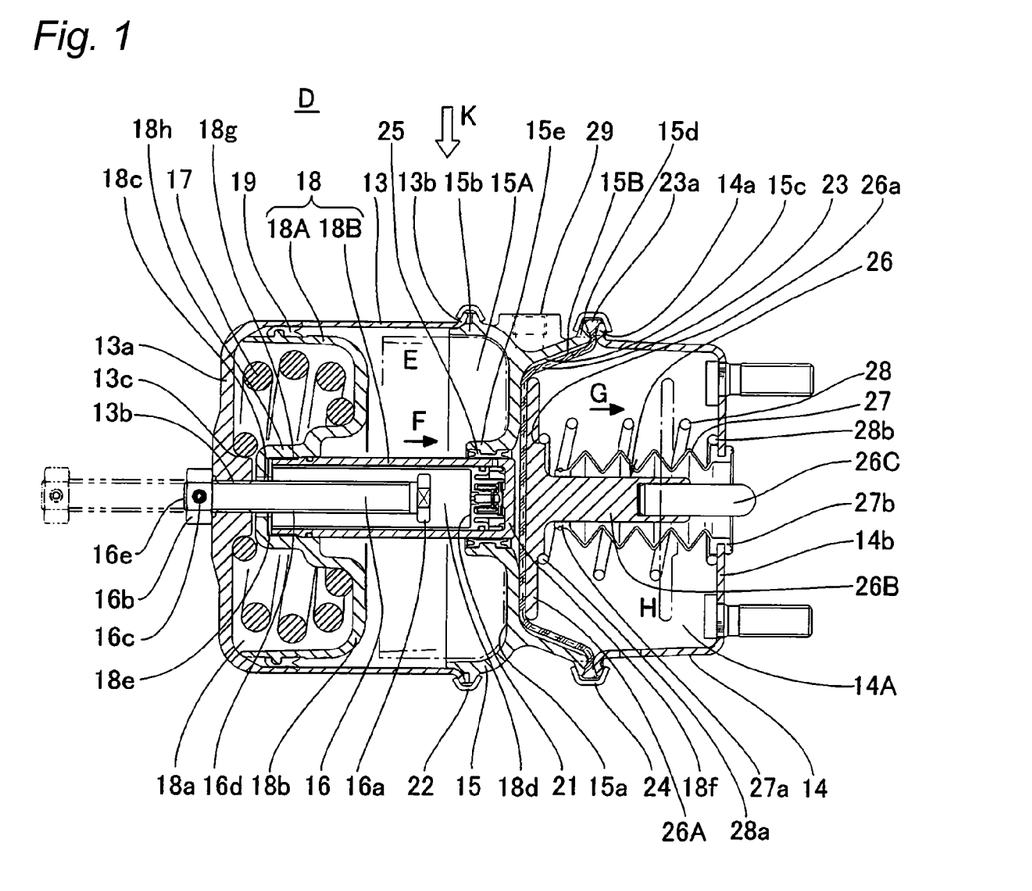
FIG. 1 is a vertical cross-sectional view showing an embodiment of a structure for a release bolt applied to an example of a spring brake chamber according to the invention.

First, before the release bolt is described, a spring brake chamber D and the structure thereof as an example applying a release bolt is described based on FIG. 1.

Reference numeral 13 is a chamber case as a case on one side, reference numeral 14 is a return spring housing case as a case on the opposite side, and both cases 13 and 14 are connected by a connecting case 15. The chamber case 13 arranges a release bolt 16 at the axial section in the longitudinal direction. The release bolt 16 is configured such that a lock nut 16b is fixed by a spring pin 16c at an end 16e as one end thereof, and a bolt head 16a having a diameter length longer than a diameter width of a axle section 16d is formed at the opposite end thereof. The chamber case 13 retractably accommodates in the axial direction a spring receiving section 18A of a piston member 18 holding a power spring 17. The piston member 18 is configured of a spring receiving section 18A and a cylinder body section 18B. The outer edge of the spring receiving section 18A of the piston member 18 includes a piston cup 19 and thereby the piston receiving section 18A is slidably fitted in an inner wall of the chamber case 13. The spring receiving section 18A of the piston member 18 is configured such that a surface 18a on one side is opened and a surface 18b on the opposite side thereof configures a convex shape, and when approaching to the right direction, the spring receiving section 18A engages a concave section of the surface 15a on one side of the connecting case 15. The surface 18a on one side forms a wall surface of a first pressure medium chamber 15A as a chamber on one side of the connecting case 15.

Further, the connecting case 15 is combinedly used with a case on one side as the chamber case 13 and a case on the opposite side as the return spring housing case 14 and thereby may be omitted.

The chamber case 13 penetrates the screw hole 13b in the center of a wall surface (a front wall surface) 13a on one side, a male screw of the axle section 16d of the release bolt 16 is screwed into the screw hole 13b, and the release bolt 16 is set in a predetermined position. In addition, the axle section 16d of the release bolt 16 is inserted into a through hole 18c that is perforated in the center of the spring receiving section 18A of the piston member 18, and at the same time, is interposed at a predetermined position of a fourth pressure medium chamber 18d formed inside the cylinder body section 18B.

Figure 2:
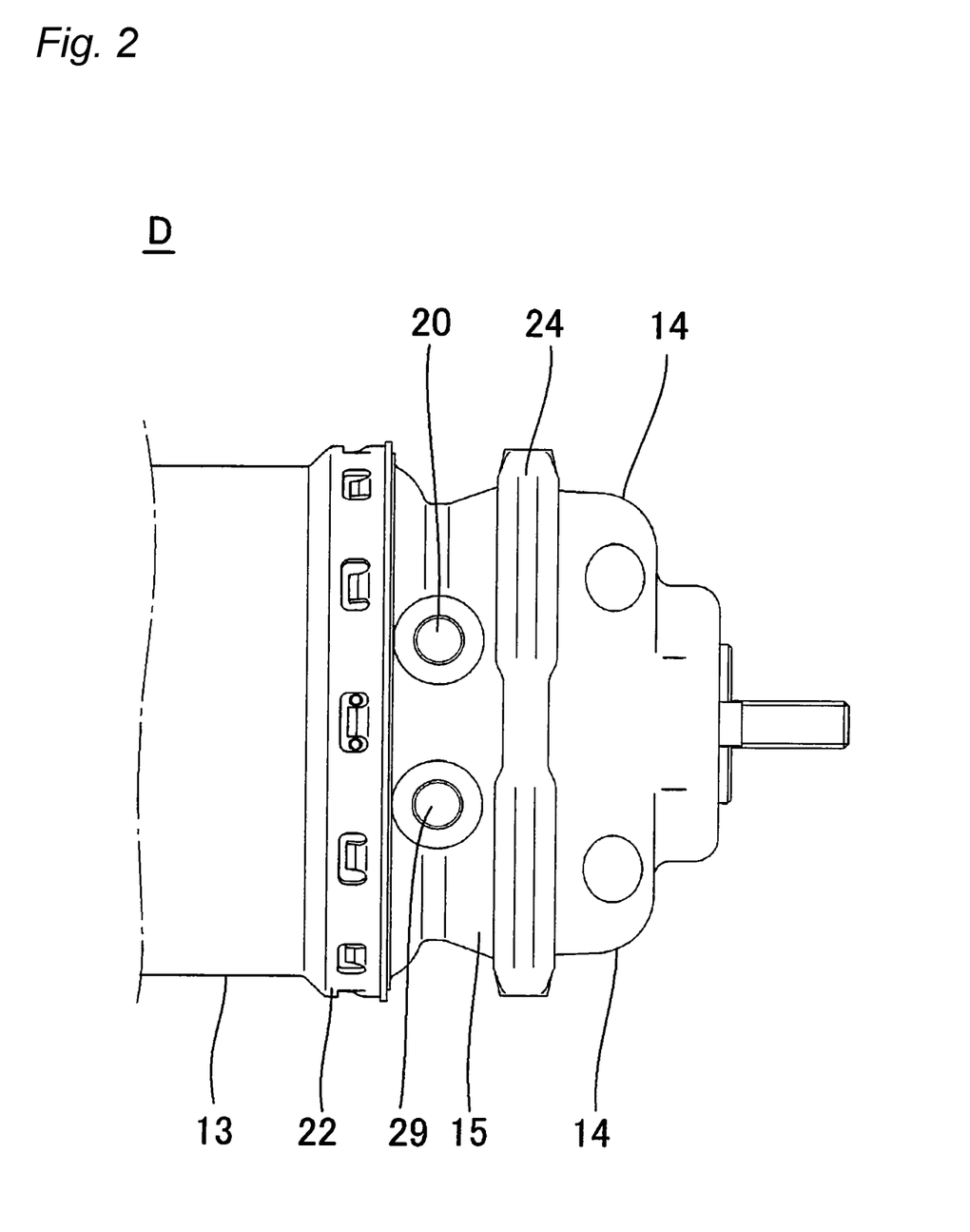
FIG. 2 is a plan view cut away of a portion of the spring brake chamber seen from the direction of the arrow k of FIG. 1.

Thus, when the driver operates the parking brake and releases the compressed air from a spring brake port 20 shown in FIG. 2 of the spring brake chamber D and the power spring 17 is expanded, the spring receiving section 18A and the cylinder body section 18B of the piston member 18 move in the direction of an arrow F and thereby the bolt head 16a of the release bolt 16 is configured to impact on a left side inner wall (a forward inner wall) 18e of the cylinder body section 18B.

Reference numeral 21 is a valve member and is arranged at the inner bottom surface of a right side wall surface (a backward wall surface) 18f of the cylinder body section 18B. The valve member 21 distributes the compressed air inside the cylinder body section 18B with the second pressure medium chamber 15B as the chamber on the opposite side of the connecting case 15 and thereby functions as the service brake (the foot brake) function with the return spring housing case 14 and as the parking brake with the chamber case 13. The valve member 21 is configured by assembling a valve main body section, a valve spring, a valve guide, a chuck valve and the like. In addition, the connecting case 15 is omitted and the chamber case 13 and the return spring housing case 14 may be integrally formed. Thus, a diaphragm 23 may be configured to be arranged in the return spring housing case 14.

The opening edge 13b on the opposite side of the chamber case 13 and the opening edge 15b on one side of the connecting case 15 are connected and fixed by a clamp ring 22. In addition, the opening outer edge 15d on the opposite side of the surface 15c on the opposite side of the connecting case 15, an outer edge 23a of the diaphragm 23 and the opening edge 14a on one side of the return spring housing case 14 are fastened and fixed by the clamp ring 24 respectively.

The return spring housing case 14 is configured of a third pressure medium chamber 14A inside thereof. The entire shape of the axial section 15e of the connecting case 15 protrudes to the side of the spring receiving section 18A and at the same time, a through hole is formed at the center thereof. A center seal 25 made of, for example, polyurethane is fitted inside the through hole. The right side wall surface 18f of the cylinder body section 18B is inserted inside the center seal 25, and at the same time, approaching thereof to the right direction of the cylinder body section 18B in other words, to the diaphragm 23 side is permitted.

Reference numeral 26 is a push rod member and is arranged inside the return spring housing case 14, in other words, in the third pressure medium chamber 14A. The push rod member 26 is configured of a substantially disk-shaped push plate 26A formed of aluminum material, a axle body section 26B that is integrally molded and protruded from the center of the push plate 26A, and a protruding rod 26C that is inserted and fixed into the central hole of the axle body section 26B. A boot 27 that is retractably deformed is arranged around the axle body section 26B of the push rod member 26. One end 27a of the boot 27 is fixed to the base end portion of the axle body section 26B with a spring ring, and the other end 27b thereof is substantially fixed to the inner edge of the central hole formed at a right side wall (a rear wall) 14b of the return spring housing case 14. Thus, when the compressed air is released from the spring brake port 20, the power spring 17 is extended and the cylinder body section 18B operates in the direction of the arrow F with the piston member 18 to move the diaphragm 23 in the right direction and to move the push rod member 26 in the direction of the arrow G while compressing the boot 27. At this time, the return spring 28 that is stretched around the boot 27 is compressed. Here, one end 28a of the return spring 28 is locked at a step section 26a of the push plate 26A and the other end thereof is fixed to the outer edge of the other end 27b of the boot 27. Thus, the spring constant of the return spring 28 is set smaller than that of the power spring 17.

Next, operation or the like by the embodiment in the structure for the spring chamber according to the invention is described.

The state shown in FIG. 1 is a running state of the heavy vehicle such as a bus or a truck, and the parking brake and the service brake (the foot brake) are not operated. When the driver, for example, operates the manipulation of the parking brake from the state described above, the compressed air with the high pressure is released from the spring brake port 20 wherein the pressure of the compressed air is high enough to contract the power spring 17 against the extending force of the power spring 17 from the chamber on one side of the connecting case 15.

After all, when the compressed air inside the first pressure medium chamber 15A is taken out to the outside and the pressure inside the chamber is decreased, the power spring 17 held inside the spring receiving section 18A, extends with a reaction force of which the power spring 17 held inside the spring receiving section 18A is compressed, from the step section 13c inside the wall surface 13a on one side of the chamber case 13 as a supporting point. The spring receiving section 18A and the cylinder body section 18B of the piston member 18 move in the direction of the arrow F, and at the same time, the spring receiving section 18A is inserted into the surface 15a on one side of the connecting case 15 and moves to a position shown in an alternate long and short dash line E. Thus, the right side wall surface 18f of the cylinder body section 18B approaches the innermost direction of the first pressure medium chamber 15A and pushes and moves the surface on one side of the diaphragm 23. Accordingly, the diaphragm 23 deforms in the direction of the right side wall 14b of the return spring housing case 14 of the third pressure medium chamber 14A, about the outer edge 23a as the supporting point.

The push plate 26A of the push rod member 26 moves in the right direction with the axle body section 26B and the protruding rod 26C while compressing the return spring 28 by the movement of the diaphragm 23. At this time, the moving position of the push plate 26A is a position shown in the alternate long and short dash line H. When the protruding rod 26C is pushed in the right direction, a wedge which is interlocked with the protruding rod 26C widely opens the sleeve of the expander that is connected to the rear portion of the spring brake chamber D via a roller. The wedge moves the brake shoe related to the expander and performs an action of braking the vehicle. Accordingly, the parking brake is applied to stop the heavy vehicle.

In addition, when the driver operates the manipulation that releases the parking brake, the compressed air of the high pressure is supplied inside the first pressure medium chamber 15A from the spring brake port 20 and the power spring 17 held inside the spring receiving section 18A is compressed. At this time, the volume inside the spring receiving section 18A is decreased and the pressure becomes high so that the force against compressing of the power spring 17 does not act and the compressed air inside the spring receiving section 18A exits to inside the second pressure medium chamber 15B via the valve member 21.

Next, when the driver pushes the foot brake, in other words, operates the service brake during running of the heavy vehicle, the compressed air of the high pressure is supplied to the chamber on the opposite side of the connecting case 15, after all, to the second pressure medium chamber 15B via the service brake port 29. Thus, the surface on one side of the diaphragm 23 is pressed and moved by the compressed air of the high pressure that is entered in the second pressure medium chamber 15B via the service brake port 29. Accordingly, the diaphragm 23 deforms to the direction of the right side wall 14b of the return spring housing case 14 of the third pressure medium chamber 14A about the outer edge 23a as the supporting point.

The push plate 26A of the push rod member 26 moves in the right direction with the axle body section 26B and the protruding rod 26C while compressing the return spring 28 by the movement of the diaphragm 23. At this time, the moving position of the push plate 26A is a position shown in the alternate long and short dash line H. When the protruding rod 26C is pushed in the right direction, a wedge which is interlocked with the protruding rod 26C widely opens the sleeve of the expander that is connected to the rear portion of the spring brake chamber D via a roller. The wedge moves the brake shoe related to the expander and performs an action of braking the vehicle. Accordingly, the service brake is applied to stop the heavy vehicle.

However, the spring brake chamber D is mounted at the bottom of the vehicle body of the heavy vehicle, and according to long term driving of the vehicle, rain water or dirt falls on the surface thereof or the like, and the rain water, dust or the like enters inside the chamber case 13 or inside the case section 30A of the cylinder body base 30 from the spring brake port 20, the service brake port 29 or the like. Thus, rain water, dust or the like attaches to the push plate 26A or the axle body section 26B of the push rod member 26. However, according to the invention, the push plate 26A or the axle body section 26B is made of one molded product from a corrosion-resistant aluminum material, and at the same time, includes the dust cover 31 so that it is light-weight and is highly durable, and it functions well without problems even though there is long term use of the heavy vehicle. In addition, the central hole is disposed at the axle body section 26B and the protruding rod 26C for example, made of steel may be fitted into the central hole and thereby when the dimension and the shape of the length of the protruding rod 26C are set to be changed in order to apply the length of the protruding rod 26C to the heavy vehicle, the push plate 26A and the axle body section 26B can be used as common components and can be employed in various vehicles.

A spring brake chamber J applying the release bolt as another example is described with reference to FIG. 5.

A point of difference from the embodiment shown in FIG. 1 is that, instead of the return spring housing case 14 as the case on the opposite side, the cylinder body base 30 is fixed to the clamp ring 24. Thus, the dust cover 31 and the push rod guide 32 are accommodated inside the cylinder body base 30.

The cylinder body base 30 is configured of the case section 30A and the cylindrical section 30B. The case section 30A forms the third pressure medium chamber 14A described above and accommodates the push rod member 26 inside thereof. The dust cover 31 made of NBR covers the surface and the head of the axle body section 26B of the push rod member 26, and they are protected from rain water, dirt or the like entering from outside the spring brake chamber J. Thus, the base end 31a of the dust cover 31 is locked on a collar of the inside outer edge 30b of the central hole 30a of the cylindrical section 30B, and at the same time, the center section 31b has a perfect circle hole in the cross-sectional shape thereof and the perfect circle hole is adhered to the outer edge surface of the protruding rod 26C of the push rod member 26. The dust cover 31 is deformed by the left and right operation of the push rod member 26 and permits the approaching of the push rod guide 32.

The push rod guide 32 has a substantially cubic shape and is inserted into the inner wall surface 30c of the central hole 30a of the cylindrical section 30B via the bush 33. In addition, a projecting rod engaging hole 32a is formed on the push rod guide 32 in the approaching direction of the protruding rod 26C. The protruding rod 26C is inserted inside the projecting rod engaging hole 32a and then the protruding rod 26C is fixed inside the projecting rod engaging hole 32a by the stopper ring 32b arranged on the inside wall of the projecting rod engaging hole 32a.

Next, operation or the like by the embodiment of the structure for the spring chamber J according to the invention is described.

Figure 5:
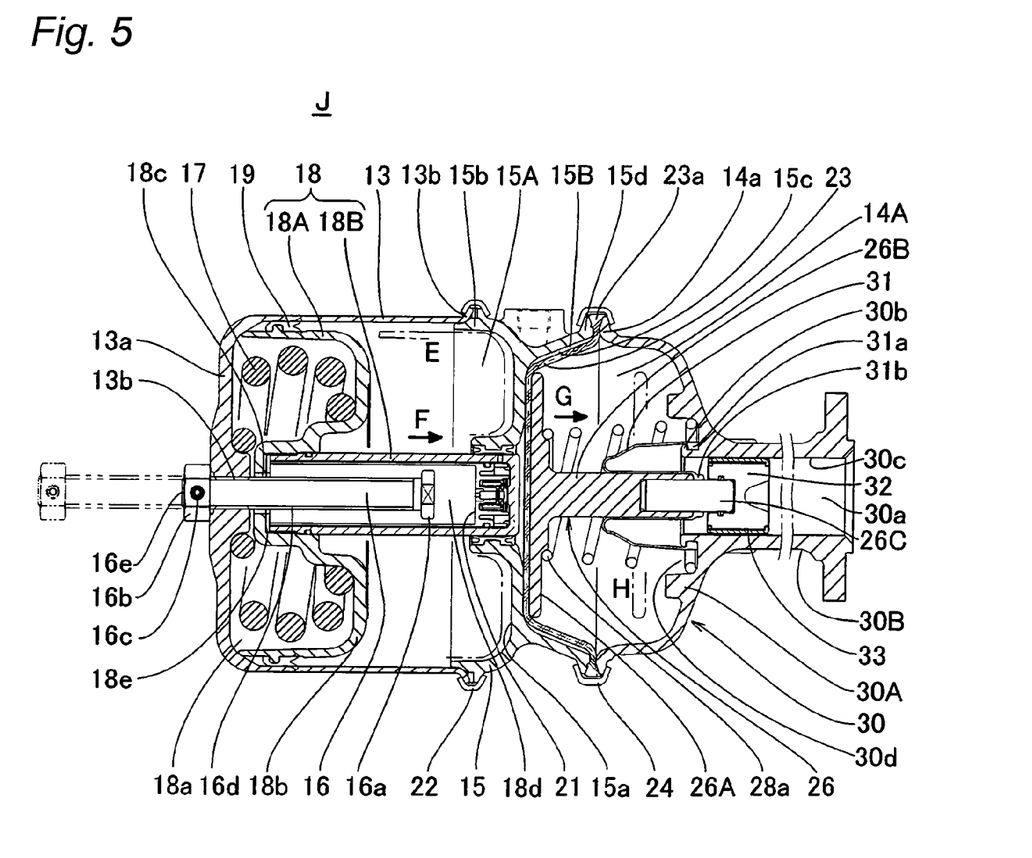
FIG. 5 is a vertical cross-sectional view showing an embodiment of a structure for a release bolt applied to another example of a spring brake chamber according to the invention.

The state shown in FIG. 5 is a running state of a heavy vehicle such as a bus or a truck, and the parking brake and the service brake (the foot brake) are not operated. When the driver for example, operates the manipulation of the parking brake from the state described above, the compressed air of the high pressure is released from the spring brake port 20 wherein the pressure of the compressed air is high enough to contract the power spring 17 against the extending force of the power spring 17 from the chamber on one side of the connecting case 15.

Specifically, when the compressed air inside the first pressure medium chamber 15A is taken out to the outside and the pressure inside the chamber is decreased, the power spring 17 held inside the spring receiving section 18A extends with a reaction force in which the power spring 17 held inside the spring receiving section 18A is compressed, about the step section 13c inside the wall surface 13a on one side of the chamber case 13 as a supporting point. The spring receiving section 18A and the cylinder body section 18B of the piston member 18 move in the direction of the arrow F, and at the same time, the spring receiving section 18A is inserted into the surface 15a on one side of the connecting case 15 and moves to the position shown in the alternate long and short dash line E. Thus, the right side wall surface 18f of the cylinder body section 18B approaches the innermost direction of the first pressure medium chamber 15A and pushes and moves the surface on one side of the diaphragm 23 about the outer edge 23a as the supporting point. Accordingly, the diaphragm 23 deforms in the direction of the right side wall 30d of the case section 30A of the cylinder body base 30 of the third pressure medium chamber 14A, about the outer edge 23a as the supporting point.

The push plate 26A of the push rod member 26 moves in the right direction with the axle body section 26B and the protruding rod 26C while compressing the return spring 28 by the movement of the diaphragm 23. At this time, the moving position of the push plate 26A is the position shown in the alternate long and short dash line H. When the protruding rod 26C is pushed in the right direction, the push rod guide 32 moves the central hole 30a of the cylindrical section 30B in the right direction while deforming the dust cover 31. The wedge which is interlocked with the protruding rod 26C widely opens the sleeve of the expander that is connected to the rear portion of the spring brake chamber J via the roller. The wedge moves the brake shoe related to the expander and performs an action of braking the vehicle. Accordingly, the parking brake is applied and the heavy vehicle is stopped.

In addition, when the driver operates the manipulation that releases the parking brake, the compressed air of the high pressure is supplied inside the first pressure medium chamber 15A from the spring brake port 20 and the power spring 17 held inside the spring receiving section 18A is compressed. At this time, the volume inside the spring receiving section 18A is decreased and the pressure becomes high so that the force against compressing of the power spring 17 does not act and the compressed air inside the spring receiving section 18A exits to inside the second pressure medium chamber 15B via the valve member 21.

Next, when the driver pushes the foot brake, in other words, operates the service brake during running of the heavy vehicle, the compressed air of the high pressure is supplied to the chamber on the opposite side of the connecting case 15, in other words, to the second pressure medium chamber 15B via the service brake port 29. Thus, the surface on one side of the diaphragm 23 is pressed and moved by the compressed air of the high pressure that is entered in the second pressure medium chamber 15B via the service brake port 29. Accordingly, the diaphragm 23 deforms to the direction of the right side wall 30d of the case of the cylinder body base 30 of the third pressure medium chamber 14A about the outer edge 23a as the supporting point.

The push plate 26A of the push rod member 26 moves in the right direction with the axle body section 26B and the protruding rod 26C while compressing the return spring 28 by the movement of the diaphragm 23. At this time, the moving position of the push plate 26A is the position shown in the alternate long and short dash line H. When the protruding rod 26C is pushed in the right direction, the push rod guide 32 moves the central hole 30a of the cylindrical section 30B in the right direction while deforming the dust cover 31. The wedge which is interlocked with the protruding rod 26C widely opens the sleeve of the expander that is connected to the rear portion of the spring brake chamber J via the roller. The wedge moves the brake shoe related to the expander and performs an action of braking the vehicle. Accordingly, the service brake is applied and the heavy vehicle is stopped.

However, the spring brake chamber J is mounted at the bottom of the vehicle body of the heavy vehicle, and according to long term driving of the vehicle, rain water or dirt falls on the surface thereof or the like, and the rain water, dust or the like enters inside the chamber case 13 or inside the return spring housing case 14 from the spring brake port 20, the service brake port 29 or the like. Thus, rain water, dust or the like attaches to the push plate 26A or the axle body section 26B of the push rod member 26. However, according to the invention, the push plate 26A or the axle body section 26B is made of one molded product from a corrosion-resistant aluminum material, and it is light-weight and is highly durable, and thereby it functions well without problems even though there is long term use of the heavy vehicle. In addition, the central hole is disposed at the axle body section 26B and the protruding rod 26C for example, made of steel may be fitted into the central hole and thereby when the dimension and the shape of the length of the protruding rod 26C are set to be changed in order to apply the length of the protruding rod 26C to the heavy vehicle, the push plate 26A and the axle body section 26B can be used as common components and can be employed in various vehicles.

Next, an embodiment of the structure for the release bolt in the spring brake chamber according to the invention based on FIGS. 3(a) and (b) is described.

16 is the release bolt in the spring brake chamber according to the invention and is applied to the spring brake chambers D and J shown in FIGS. 1 and 5. Thus, the release bolt 16 is configured of a axle section 16d, a bolt head 16a and an end 16e. The outer edge of the axle section 16d engraves a male screw 16f over the whole area thereof. As shown in FIG. 3(b), the bolt head 16a has a diameter length D2 wider than the diameter length D1 of the axle section 16d and forms the collar 16g that secures a predetermined thickness thereof. The shape of the collar 16g shown in FIG. 3(b) is a plan view seen from the direction of the arrow line L-L in FIG. 3(a). As shown in FIG. 3(b), the bolt head 16a includes the shape of the collar 16g in which both side walls of the circular collar are cut and cutting surfaces 16h and 16h are formed. In the view, 16c is a spring pin and is to fix the nut 16b at the end section of the release bolt 16.

Thus, the power spring 17 is inserted from the case on one side in other words, from the opening edge 13b on the opposite side of the chamber case 13 and thereby the power spring 17 comes in contact with the step section 13c inside the wall surface 13a on one side of the chamber case 13, and at the same time, the power spring 5 is accommodated in the spring receiving section 6A. As shown in FIGS. 3(a) and (b), the release bolt 16 of which the male screw 16f is formed at the outer edge of the axle section 16d of the release bolt 16 inserts into the through hole 18c perforated at the center of the spring receiving section 18. Here, the bolt head 16a of the release bolt 16 forms the collar 16g in which the cutting surfaces 16h and 16h are formed at both side surfaces thereof. Thus, the assembly worker protrudes the end 16e of the male screw 16f of the release bolt 16 to the outside of the wall surface 13a on one side of the chamber case 13 while engaging and rotating the bolt head 16a in other words, the collar 16g of the release bolt 16 with a tool. A lock nut 16b is screwed on the end 16e of the male screw 16f and engages and fixes to the wall surface (the forward wall surface) 13a on one side of the chamber case 13. Thus, the screw section 18g of the cylinder body section 18B which inserts the bolt head 16a of the release bolt 16 is screwed in the outer edge wall 18h of the through hole 18c of the spring receiving section 18A, and engages and fixes to the outer edge wall 18h. Thus, the connecting case 3, the case 2 on the opposite side or the like is assembled sequentially and the spring brake chamber D is completed.

Embodiment 1

Figure 4:
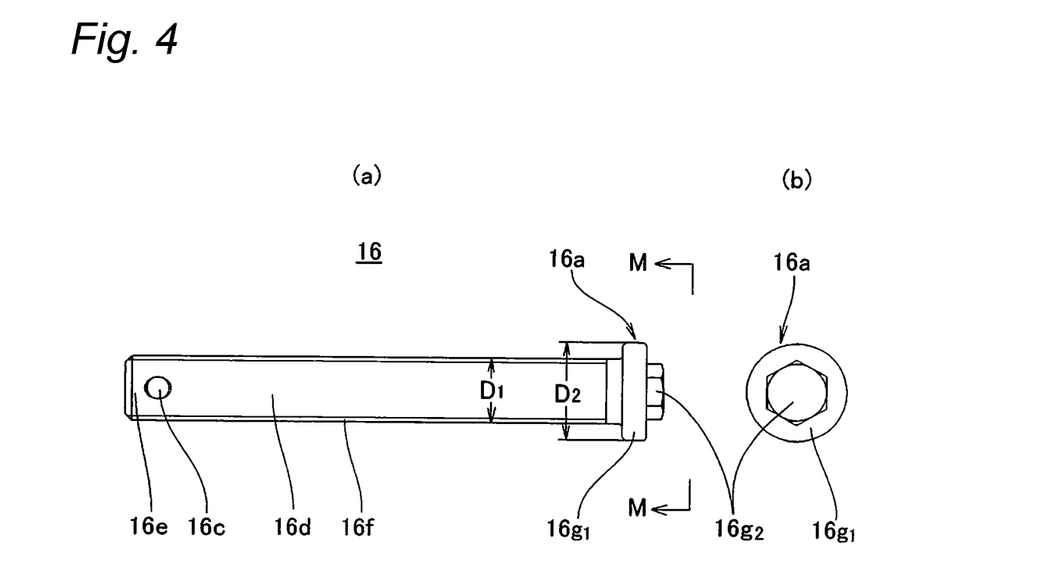

Next, an embodiment of the structure for the release bolt in the spring brake chamber according to the invention based on FIGS. 4(a) and (b) is described.

16A is a release bolt in the spring brake chamber according to the invention and is applied to the spring brake chambers D and J shown in FIGS. 1 and 5. Thus, the release bolt 16A is configured of the axle section 16d, the bolt head 16a and the end 16e. The outer edge of the axle section 16d engraves all regions of the male screw 16f. As shown in FIG. 4(b), the bolt head 16a in other words, a circular collar 16g1 has the diameter length D2 wider than the diameter length D1 of the axle section 16d and forms the circular collar 16g1 that secures a predetermined thickness thereof and a hexagonal headed bolt 16g2 integrally formed and protruded from the circular collar 16g1. The shape of the bolt head 16a shown in FIG. 4(b) is a plan view seen from the direction of the arrow line M-M in FIG. 4(a). As shown in FIG. 4(b), the bolt head 16a includes the hexagonal headed bolt 16g2 at the center portion of the circular collar 16g1. In the view, 16c is the spring pin and is to fix the lock nut 16b at the end section of the release bolt 16A.

Thus, the power spring 17 is inserted from the case 1 on one side in other words, from the opening edge 13b on the opposite side of the chamber case 13 and thereby the power spring 17 is contacted, and at the same time, the power spring 17 is accommodated in the spring receiving section 18. As shown in FIGS. 4(a) and (b), the release bolt 16A is configured of such that the male screw 16f that is formed at the outer edge of the axle section 16d of the release bolt 16A inserts into the through hole 18c perforated at the center of the spring receiving section 18. Here, the bolt head 16a of the release bolt 16A forms the circular collar 16g1 and the hexagonal headed bolt 16g2. Thus, the assembly worker protrudes the end 16e of the male screw 16f of the release bolt 16A to the outside of the wall surface (the forward wall surface) 13a on one side of the chamber case 13 while engaging and rotating the hexagonal headed bolt 16g2 of the bolt head 16a of the release bolt 16A with the tool. The lock nut 16b is screwed on the end 16e of the male screw 16f and engages and fixes to the wall surface (the forward wall surface) 13a on one side of the chamber case 13. Thus, the screw section 18g of the cylinder body section 18B which inserts the bolt head 16a of the release bolt 16 is screwed in the outer edge wall 18h of the through hole 18c of the spring receiving section 18A, and engages and fixes to the outer edge wall 18h. Thus, the connecting case 3, the case 2 on the opposite side or the like is assembled sequentially and the spring brake chambers D and J are completed.

Embodiment 2

Next, an embodiment of a structure for a spring brake chamber J according to the invention is described based on FIG. 5.

Different points from that of the embodiment shown in FIG. 1 is that the cylinder body base 30 instead of the return spring housing case 14 as the case on the opposite side is fixed to the clamp ring 24. Thus, the dust cover 31 and the push rod guide 32 are accommodated inside the cylinder body base 30.

The cylinder body base 30 is configured of the case section 30A and the cylindrical section 30B. The case section 30A forms the third pressure medium chamber 14A described above and accommodates the push rod member 26 inside thereof. A the dust cover 31 made of NBR covers the surface and the head of the axle body section 26B of the push rod member 26, and they are protected from rain water, dirt or the like entering from outside the spring brake chamber J. Thus, the base end 31a of the dust cover 31 is locked on a collar of the inside outer edge 30b of the central hole 30a of the cylindrical section 30B, and at the same time, the center section 31b has a true circular hole in a cross-sectional shape thereof and the true circular hole is absorbed and fixed to the outer edge surface of the protruding rod 26C of the push rod member 26. The dust cover 31 is deformed by the left and right operation of the push rod member 26 and permits the approaching of the push rod guide 32.

The push rod guide 32 has a substantially cubic shape and is inserted into the inner wall surface 30c of the central hole 30a of the cylindrical section 30B via the bush 33. In addition, a projecting rod engaging hole 32a is formed on the push rod guide 32 in the approaching direction of the protruding rod 26C. The protruding rod 26C is inserted inside the projecting rod engaging hole 32a and then the protruding rod 26C is fixed inside the projecting rod engaging hole 32a by the stopper ring 32b arranged on the inner wall of the projecting rod engaging hole 32a.

Other configuration, operation or the like is substantially the same as the embodiment of the structure for the spring brake chamber according to the invention shown in FIG. 1 described above. Thus, the same numeral is added therein and the description thereof is omitted.

In the embodiment, the return spring is arranged inside the return spring housing case, however, it may be arranged to the brake shoe side besides the return spring housing case.

The invention is a structure for a spring brake chamber connecting a chamber case and a return spring housing case includes a piston member having a spring receiving section which holds a power spring inside the chamber case and a cylinder body section which is interlocked with the spring receiving section; a diaphragm arranged inside the return spring housing case chamber in the return spring housing case, defining pressure medium chambers and deformed by an advancing and retracting operation of the cylinder body section; and a push rod member advancing and retracting with the operation of the diaphragm, and performing braking or releasing of the brake, wherein the invention may employ the structure of the release bolt in the spring brake chamber characterized that the release bolt screwed in the screw hole of the wall surface (the forward wall surface) on one side of the chamber case is a collar where the cutting surface is formed at both side surfaces of the bolt head.

Furthermore, a structure for a spring brake chamber connecting a chamber case and a return spring housing case includes a piston member having a spring receiving section which holds a power spring inside the chamber case and a cylinder body section which is interlocked with the spring receiving section; a diaphragm arranged inside the return spring housing case chamber in the return spring housing case, defining pressure medium chambers and deformed by an advancing and retracting operation of the cylinder body section; and a push rod member advancing and retracting with the operation of the diaphragm, and performing braking or releasing of the brake, wherein the invention may employ the structure of the release bolt in the spring brake chamber characterized by the release bolt screwed in the screw hole of the wall surface (the forward wall surface) on one side of the chamber case forming the circular collar and a hexagonal headed bolt projected from the circular collar.

INDUSTRIAL APPLICABILITY

The invention relates to the structure for the release bolt to apply specifically for compressed air brake device or the like to vehicles and the spring brake chamber is employed in the braking control system of heavy vehicles, for example, buses, trucks and trailers. In addition, the release bolt according to the invention has the structure in which the work for fastening the bolt head thereof can be easily performed, assembling to the spring brake chamber is improved and the quality of assembly is high and thereby promoting the use of the release bolt for the automobile or various vehicles.

In addition, the invention relates to the structure for the spring brake chamber applied specifically to a compressed air brake device or the like for vehicles and a spring brake chamber employed in the braking control system of heavy vehicles, for example, buses, trucks and trailers. The structure for the spring brake chamber according to the invention is configured such that a highly durable push rod member is provided in which the number of components is reduced as well as the base plate and axle being integrally molded using an aluminum (Al) material, in which the length of the tip of the push rod member which is attached to the axle is adjusted and set, and which reduces the production effort to a large extent and results in little deterioration.

REFERENCE SIGNS LIST 13 chamber case
13a wall surface on one side (forward wall surface)
13b opening edge on opposite side
13c step section
14 return spring housing case
14A third pressure medium chamber
14a opening edge on one side
14b right side wall (rear wall)
15 connecting case
15A first pressure medium chamber
15B second pressure medium chamber
15a connecting case on one side
15b opening edge on one side
15c surface on opposite side
15d opening outer edge on opposite side
15e axial section
16 release bolt
16a bolt head
16b lock nut
16c spring pin
16d axle section
16e end
16f male screw
16g collar
16g1 circular collar
16g2 hexagonal headed bolt
16h cutting surface
17 power spring
18 spring receiving section
18 piston member
18A spring receiving section
18B cylinder body section
18a surface on one side of spring receiving section
18b surface on opposite side of spring receiving section
18c through hole
18d fourth pressure medium chamber
18e left side inner wall (forward inner wall)
18f right side wall surface (backward wall surface)
18g screw section
18h outer edge wall
19 piston cup
20 spring brake port
21 valve member
22 clamp ring
23 diaphragm
23a outer edge
24 clamp ring
25 center seal
26 push rod member
26A push plate
26B axle body section
26C protruding rod
26a step section
27 boot
27a one end
27b other end
28 return spring
28a one end
29 service brake port
30 cylinder body base
30A case section
30B cylindrical section
30a central hole
30b inside outer edge
30c inner wall surface
30d right side wall
31 dust cover
31a base end
31b center section
32 push rod guide
32a projecting rod engaging hole
32b stopper ring
33 bush

The invention claimed is:

1. A structure for a spring chamber formed by connecting a chamber case and a return spring housing case, comprising:
a piston member having a spring receiving section which holds a power spring inside the chamber case and a cylinder body section which is interlocked with the spring receiving section;

a diaphragm, arranged inside a return spring housing case chamber in the return spring housing case, deformed by an advancing and retracting operation of the cylinder body section;

a connecting case which connects the chamber case and the return spring housing case and defines a first medium chamber on one side of the connecting case and a second medium chamber between the other side of the connecting case and the diaphragm;

a valve member provided at the inner bottom surface of the cylinder body section, said valve member allows release of compressed air inside of the spring receiving section to the second medium chamber; and a push rod member, advancing and retracting with an operation of the diaphragm, and performing braking or releasing of a brake, wherein the push rod member is formed with integral molding of a push plate and an axle body section with aluminum material such that the axle body section extends continuously from the push plate and has a distal end, the distal end of the axle body section is formed with a central hole, and a protruding rod is fitted to the central hole, and said axle body section extends from the push plate in a direction of the advancing and the retracting of the push rod member and the central hole extends along said direction.

2. A structure for a spring chamber formed by connecting a chamber case and a cylinder body base, comprising:

a piston member having a spring receiving section which holds a power spring inside the chamber case and a cylinder body section which is interlocked with the spring receiving section;

a diaphragm, arranged inside a cylinder body base chamber in the cylinder body base, deformed by an advancing and retracting operation of the cylinder body section;

a connecting case which connects the chamber case and the cylinder body base and defines a first medium chamber on one side of the connecting case and a second medium chamber between the other side of the connecting case and the diaphragm;

a valve member provided at the inner bottom surface of the cylinder body section, said valve member allows release of compressed air inside of the spring receiving section to the second medium chamber; and a push rod member, advancing and retracting with an operation of the diaphragm, and performing braking or releasing of a brake, wherein the push rod member is formed with integral molding of a push plate and an axle body section with aluminum material such that the axle body section extends continuously from the push plate and has a distal end, the distal end of the axle body section is formed with a central hole, and a protruding rod is fitted to the central hole, and said axle body section extends from the push plate in a direction of the advancing and the retracting of the push rod member and the central hole extends along said direction.

* * * * *